United States Patent
Diamond et al.

(10) Patent No.: US 9,596,560 B2
(45) Date of Patent: Mar. 14, 2017

(54) SYSTEMS AND METHODS FOR DATA TRANSFER

(71) Applicant: Misfit Wearables Corporation, Salem, NH (US)

(72) Inventors: Steven Diamond, San Francisco, CA (US); Sonny Vu, Salem, NH (US)

(73) Assignee: FOSSIL GROUP, INC., Richardson, TX (US)

( * ) Notice: Subject to any disclaimer, the term of this patent is extended or adjusted under 35 U.S.C. 154(b) by 0 days.

(21) Appl. No.: 14/309,195

(22) Filed: Jun. 19, 2014

(65) Prior Publication Data

US 2015/0004912 A1    Jan. 1, 2015

Related U.S. Application Data

(60) Provisional application No. 61/837,254, filed on Jun. 20, 2013.

(51) Int. Cl.
| | |
|---|---|
| *H04B 7/00* | (2006.01) |
| *H04W 4/00* | (2009.01) |
| *H04W 4/02* | (2009.01) |
| *H04B 1/00* | (2006.01) |

(52) U.S. Cl.
CPC ........... *H04W 4/008* (2013.01); *H04W 4/023* (2013.01); *H04W 4/027* (2013.01)

(58) Field of Classification Search
CPC ...... H04W 84/18; H04M 1/7253; A61B 5/721
USPC .................. 455/41.1–41.3; 600/300
See application file for complete search history.

(56) References Cited

U.S. PATENT DOCUMENTS

| | | | |
|---|---|---|---|
| 5,852,232 A | 12/1998 | Samsavar et al. | |
| 2007/0027367 A1* | 2/2007 | Oliver ............... | A61B 5/0002 600/300 |
| 2009/0270743 A1 | 10/2009 | Dugan et al. | |
| 2011/0012793 A1* | 1/2011 | Amm ................. | H01Q 1/243 343/702 |
| 2011/0304583 A1 | 12/2011 | Kruglick | |
| 2012/0128154 A1 | 5/2012 | Ran | |
| 2014/0085201 A1* | 3/2014 | Carmel-Veilleux ... | G06F 1/1694 345/158 |

OTHER PUBLICATIONS

Search Report and Written Opinion for International Patent Application No. PCT/US2014/043161 mailed Nov. 5, 2014 (11 pages).

* cited by examiner

*Primary Examiner* — Lee Nguyen
(74) *Attorney, Agent, or Firm* — Cooley LLP

(57) ABSTRACT

A method includes sensing physical proximity between a first device and a second device. At least one of the first device and the second device has transferrable data stored thereon. The method further includes monitoring whether the first device and the second device maintain physical proximity. The method further includes transferring the data between the first device and the second device while the first device and the second device maintain physical proximity.

28 Claims, 10 Drawing Sheets

SYSTEMS AND METHODS FOR DATA TRANSFER

CROSS-REFERENCE TO RELATED APPLICATIONS

This application claims priority to and the benefit of U.S. Provisional Application No. 61/837,254, filed on Jun. 20, 2013, entitled, "SYSTEMS AND METHODS FOR DATA TRANSFER," the disclosure of which is incorporated by reference herein in its entirety.

BACKGROUND

Embodiments described herein relate generally to systems and methods to facilitate data transfer between a first device (such as a personal fitness device) and a second device. The desire for portability and miniaturization of personal electronic devices, activity tracking and/or monitoring devices such as fitness trackers (e.g. pedometers), etc. places increasing demands on battery design and performance. Often, this results in batteries that are tightly integrated into the hardware, not easily replaceable by the user, and hence must function for extended periods of time, such as several months and even years.

It is also increasingly desirable to be able to wirelessly download or otherwise transfer the tracking/monitoring data acquired by these fitness devices, such as for tracking progress, for sharing on social media, and/or the like. Wireless transfer simplifies device design since no transfer ports and cables need be provided. Wireless transfer is, however, more energy intensive than wired transfers due to relatively greater attenuation of the wireless signal with distance.

SUMMARY

Systems, devices, and methods for facilitating data transfer between two devices are described herein. In some embodiments, a method includes sensing physical proximity between a first device and a second device. At least one of the first device and the second device has transferrable data stored thereon. The method further includes monitoring whether the first device and the second device maintain physical proximity, and then transferring the data between the first device and the second device while the first device and the second device maintain physical proximity.

In some embodiments, a device includes a sensing component configured to sense physical proximity to a fitness device. The fitness device has fitness data stored thereon. The sensing component is further configured to monitor whether the fitness device remains in physical proximity. The device further includes a communication component configured to receive the fitness data from the fitness device while the fitness device remains in physical proximity.

In some embodiments, a system includes a first device having transferrable data stored thereon and a second device configured to sense physical proximity with the first device. The second device is further configured to request the data from the first device upon sensing physical proximity. The first device is configured to transfer the data to the second device in response to the request for the data while the first device and the second device maintain physical proximity.

DETAILED DESCRIPTION

Figure 1:
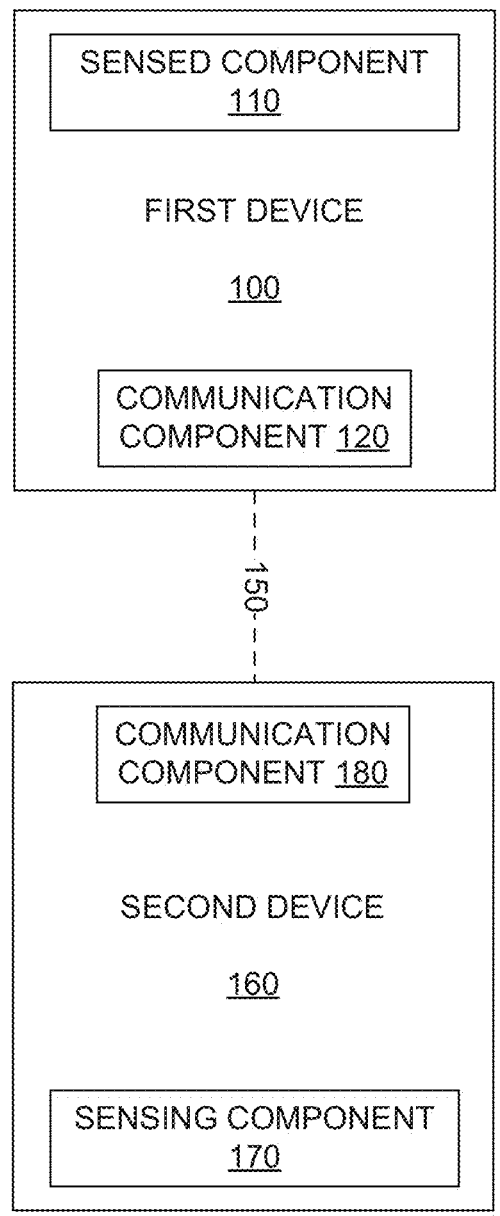
FIG. 1 is a schematic illustration of a wireless data transfer setup, according to an embodiment.

Systems and methods are described herein that enable proximity-based and/or proximity-triggered data transfer between two or more devices when the two are in physical proximity, including (but not limited to) when the devices are in physical contact. Embodiments described herein provide an energy efficient approach towards short-distance data transfer that places minimal demand on the powering means for the device(s).

As used in this specification, the singular forms "a," "an" and "the" include plural referents unless the context clearly dictates otherwise. Thus, for example, the term "a network" is intended to mean a single network or a combination of networks.

As used herein, the term "physical proximity" can be used to describe any spatial positioning of two or more devices wherein one is detectable by the other(s). Said another way, two devices can have physical proximity, and/or be deemed to be in physical proximity, when a detection signal generated at one of the devices meets a specified detection criterion. The strength of the detection signal can be a measure of a physical distance between the devices, and accordingly, a measure of physical proximity. The detection criterion can include, but not be limited to, that the presence of one device is detectable by the other device based on detection constraints (e.g., the presence of one device results in a detection signal in the other device that has a value above a noise threshold for the detection signal), when the detection signal is greater than a minimum threshold, when the detection signal is lesser than a maximum threshold, and/or the like. Similarly, two devices can be deemed to not be in physical proximity when the detection signal does not meet a specified detection criterion, such as when, but not limited to, the presence of one device results in a detection signal in the other device that has a value below a noise threshold for the detection signal, when the detection signal is lower than a minimum threshold, when the detection signal is higher than a maximum threshold, and/or the like.

In some embodiments, a first device (sometimes also referred to as a "personal fitness device") includes one or more sensors for monitoring, tracking, and/or otherwise determining fitness parameters/data associated with an individual. The first device can also include one or more sensed components detectable by the second device. The first device can also include one or more storage media for storing the fitness parameters/data. The first device can also include one or more processors for controlling operation of the first device. The first device can also include one or more communication components for wirelessly communicating and/or otherwise transferring the stored fitness parameters and/or fitness parameters, such as to a second device, for example. In some embodiments, the transferring can be done in real-time and/or continuously; in other words, the first device can acquire and transmit the fitness parameters in a continuous manner. In other embodiments, the transferring can be done on a periodic basis. For example, in some embodiments, data can be transferred from the first device to the second device every few hours.

The first device can also include one or more power sources. In some embodiments, the first device can include a power switch for powering the first device on and off, while in other embodiments, the first device does not have a power switch that can be manipulated by a user. In some embodiments, the first device can be powered on and off by the second device.

The fitness parameters can be physiological, geospatial/timing, and/or the like. Examples of physiological parameters include, but are not limited to, heart and/or pulse rate, blood pressure, muscle electrical potential, nerve electrical potential, temperature, brain waves, motion, measures of activity, number of steps taken, and/or the like. Examples of geospatial and/or timing parameters include but are not limited to, location, acceleration, pace, distance, altitude, direction, velocity, speed, time elapsed, time left, and/or the like. Accordingly, the one or more sensors can include, but are not limited to, one or more temperature sensors, electrical sensors, conductance sensors, accelerometers, magnetometers, gyroscopes, capacitive sensors, optical sensors, cameras, global positioning system (GPS) sensors, and/or the like.

The one or more communication components can be implemented in software (e.g. as a communication module stored in the storage media or of the one or more processors) and/or hardware (e.g. as a separate circuit, antenna, speakers, light emitting diodes (LEDs), etc.) to enable any suitable communication protocol. The communication protocol can include, but is not limited to, Bluetooth, low power Bluetooth (BLE), near field communication (NFC), radio frequency (RF), Wi-Fi, and/or the like. In some embodiments, the communication protocol can include audio-based protocols such as using a modem to transmit data using audio frequencies and/or ultrasonic frequencies. In some embodiments, the communication protocol can include light-based optical data transfer, such as a pattern of blinking LEDs or a single blinking LED, for example. In some embodiments, the communication protocol can encompass variation of a magnetic field associated with the first device, such as with an electromagnet of the first device.

The one or more sensed components can be any component associated with enabling detection of the first device by the second device. In some embodiments, the sensed component(s) include a conductive portion (e.g. metallic portion) detectable by the second device. In some embodiments, the sensed component(s) include a magnetic portion detectable by the second device.

In some embodiments, the same component can be employed as a communication component as well as a sensed component. As a non-limiting example, an electromagnet of the first device can be detected by the second device to determine proximity between the two devices, and the magnetic field of the electromagnet can be varied to communicate the fitness parameters from the first device to the second device. As another example, a conductive surface of the first device can be detected when in close proximity to or in contact with a capacitive component of the second device, for example, a capacitive panel, such as the touch screen of a Smartphone. Such capacitive components generally detect changes to the electric field caused by proximity of conductive element. Thus, the disruption of the measure electric field (and hence the apparent capacitance) can be varied by the first device to communicate the fitness parameters from the first device to the second device. For example, the fitness parameters can be communicated by moving a conductive element closer to and away from the capacitive component as a means of generating a time-varying capacitance signal that encodes the fitness parameters. The following briefly summarizes, but does not limit, the various approaches that may be employed for both communication and sensing:

Capacitance
Proximity determination by sensing change in capacitance when a conductive portion on the first is brought close to a capacitive component (e.g., a capacitive sensor) on the second device.
Data transfer via the conductive portion moving closer to and away from the capacitive component for generating a time-varying capacitance signal encoding the data.

Audio
Proximity determination by sensing a known audio signal (e.g., audible range, high frequency, ultrasonic, and/or the like) generated by the first at the second device, such as via a microphone.
Data transfer via a varying audio signal encoding the data.

Magnetic field
Proximity determination via a magnetometer of the second device to detect a magnet (regular magnet or an electromagnet) of the first device.
Data transfer via modulation of the magnetic field as a means to encode the data NFC/RF/Bluetooth/BLE/Wifi
Proximity determination via detecting signal strength
Data transfer via signal content Optical
Proximity determination via strength of received optical signal (e.g., visible light or other parts of the spectrum such as infra-red)
Data transfer via modulation of optical content The one or more storage media of the first device can be any suitable storage media for storing the fitness parameters. In some embodiments, the storage media include non-transitory computer-readable media, as described below. In some embodiments, the storage media include non-volatile computer storage media such as flash memory, EEPROM (Electrically Erasable Programmable Memory), FRAM (Ferroelectric Random Access Memory), NVRAM (Non Volatile Random Access Memory), SRAM (Static Random Access Memory), and DRAM (Dynamic Random Access Memory). The one or more processors can be any suitable processing device for controlling operation of the various components of the first device. In some embodiments, one or more modules are implemented on the storage media and/or the processor for controlling operation of the first device.

The one or more power sources of the first device can include, but is not limited to, replaceable batteries such as button cells, an integrated battery, a rechargeable battery (including an inductively-rechargeable battery), capacitors, super-capacitors, and/or the like.

The second device can be any device including at least one sensing component for detecting the first device, and at least one communication component for communicating with the first device. In some embodiments, the sensing component and the communication component for the second device are the same. The sensing component can be configured to sense physical proximity to a fitness device (e.g., such as the first device), the fitness device having fitness data stored thereon. The sensing component can be further configured to monitor whether the fitness device remains in physical proximity. The communication component can be configured to receive the fitness data from the fitness device while the fitness device remains in physical proximity.

In some embodiments, the fitness data includes one or more of the following: heart rate, pulse rate, blood pressure, muscle electrical potential, nerve electrical potential, temperature, brain waves, motion, measures of activity, number of steps taken, geospatial parameters, and timing parameters.

The second device can also include one or more processors for controlling operation of the second device, and one or more storage media for storing the fitness parameters received from the first device. In some embodiments, the storage media and/or the processor of the second device is configured for detecting physical proximity of the first device. In some embodiments, the second device is further configured for triggering data transfer between the first and second device (e.g. the transfer of the stored fitness parameters from the first device to the second device) upon detection of physical proximity. In other words, the second device can be configured for initiating proximity-triggered data transfer between the first device and the second device. In some embodiments, the second device executes a cloud-based application for implementing proximity-triggered data transfer.

The sensing component(s) of the second device can include, but is not limited to, one or more of a capacitive component (e.g., a capacitive panel/sensor, such as a touch screen), a magnetometer, an optical sensor, a camera, an accelerometer, a microphone, and/or the like.

In some embodiments, the communication component can be further configured to vary a power level associated with the transfer of data based on variations in the physical proximity. For example, a strong detection signal can indicate a relatively smaller physical distance between the second device and the first device, so the communication component of the second device and/or the first device can be further configured to reduce the power level of the transmitted data to conserve battery power.

Generally, in some embodiments, variations in the strength of the detection signal and/or variations in physical proximity, can serve as a trigger for one or more actions such as varying the power level associated with the transfer of data. The actions can include, but are not limited to, varying the extent of compression of the transferred data, varying the nature of encryption of the transferred data, varying the power source(s) employed by the transferring/receiving device, and/or the like.

In some embodiments, the communication component can be further configured to terminate transfer of the fitness data when the fitness device is longer in physical proximity, or when the fitness data has been transferred, or both. In some embodiments, terminating transfer of the fitness data can include reducing the power level of the transmitted data to virtually zero. In this manner, transfer of data can be stopped at greater physical distances to conserve power, and can be resumed when the devices are closer together, i.e., achieve physical proximity again.

The communication component on the second device can be implemented in software and/or hardware to enable any suitable communication protocol. The communication protocol can include, but not limited to, Bluetooth, low power Bluetooth (BLE), near field communication (NFC), radio frequency (RF), Wi-Fi, electrical conduction, acoustic/audio, varying magnetic field, and/or the like. In some embodiments, the communication protocol employed can be based on the strength of the detection signal. For example, initially Bluetooth can be employed as the communication protocol for the transfer of data, and when the devices are brought relatively closer, the communication protocol can be switched to BLE to conserve energy.

FIG. 1 is a schematic illustration of a wireless data transfer setup/system, according to an embodiment. The first device 100 is operable for use by a user for collecting user-specific information, such as fitness-related parameters, biometric information, and/or the like. In some embodiments, the first device 100 can include a personal fitness device or activity tracker such as, but is not limited to, a pedometer, a physiological monitor such as a heart rate monitor, a respiration monitor, a GPS system (including GPS watches), and/or the like. The first device 100 includes at least one sensed component 110, and at least one communication component 120. The first device 100 can further include sensors, storage media, and processor(s) (not shown) as described earlier as suitable for collecting, storing, and transmitting the fitness parameters.

The first device 100 can be in communication with the second device 160 via a communication link 150 as shown in FIG. 1 via a network. The communication link 150 can be any suitable means for wireless communication between the first device 100 and the second device 160, including capacitive, magnetic, optical, acoustic, and/or the like. The communication link 150 can include bidirectional communication between the first device 100 and the second device 160. In some embodiments, the communication link 150 can be characterized based on the direction of information flow, and/or based on the nature of the information being communication. For example, communication of fitness parameters from the first device 100 to the second device 160 can be carried out via magnetic field changes, while control signals from the second device to the first device can be transmitted via BLE. The communication link can also be switched dynamically, such as by using, e.g., a capacitive link when the first device and second device are in physical contact, and switching to, e.g., BLE when the devices are close but separated. In some embodiments, any or all communications may be secured (e.g., encrypted) or unsecured, as suitable and as is known in the art.

The second device 160 can include a personal computer, a server, a work station, a tablet, a mobile device (such as a Smartphone), a watch, a cloud computing environment, an application or a module running on any of these platforms, and/or the like. In some embodiments, the second device 160 is a Smartphone executing a native application, a web application, and/or a cloud application for implementing proximity-triggered data transfer. In some embodiments, the first device 100 and the second device 160 are commonly owned. In some embodiments, the first device 100 and the cloud application executing on the second device 160 are commonly owned. In other embodiments, the second device 160 and/or the cloud application executing on the second device are owned by a third party with respect to the first device 100.

The second device 160 includes at least one sensing component 170 for sensing the first device 100 (i.e. for sensing the sensed component 110 of the first device), and further includes at least one communication component 180 for communicating with the first device via the communication link 150 (i.e. for communicating with the communication component 180 of the first device).

During operation, the second device 160 is configurable to determine that the first device 100 is in physical proximity. In some embodiments, the communication component 180 of the second device can be used to determine proximity. In other embodiments, the communication component 120 of the first device can be used to detect proximity, and some other means (such as audio) can be used to trigger sensing component 170. In some embodiments, determining physical proximity includes instantaneously detecting the presence of the first device 100 by the sensing component 170, such as when the first device and the second device are placed in momentary or persistent contact with each other or 'bumped' together, for example. In other embodiments, the sensed component 110 of the first device can be used to detect contact between the two devices. In some embodiments, determining physical proximity includes detecting the presence of the first device 100 by the sensing component 170 for a predetermined and/or programmable duration of time. In this manner, the system and method can be configurable to ensure that the first and second devices are likely to remain in proximity before initiating data transfer. In some embodiments, determining physical proximity includes detecting the presence of the first device 100 to be within a predetermined and/or programmable distance of the second device 170, such as might be inferred by the strength of the signal output from the sensing component 170, for example. In some embodiments, determining physical proximity includes detecting the presence of the first device 100 to be within a predetermined and/or programmable distance of the second device 160, such as detecting continued contact, for example as might be measured when a sufficiently conductive portion of device 100 is in close enough proximity with a capacitive touch screen of device 160, or for example if a magnetic element of device 100 is in sufficiently close proximity with a magnetometer of device 160.

In some embodiments, once the first and second devices are deemed to be in physical proximity, the second device 160 is further configurable to transmit a control signal to the first device 100 to initiate data transmission of the stored fitness parameters via the communication link 150, and is further configurable to store, transmit, and/or analyze the received data. In some embodiments, once the first and second devices are deemed to be in physical proximity, the first device 100 is further configurable to transmit a control signal to the second device 160 to initiate data transmission of the stored fitness parameters via the communication link 150, and is further configurable to store, transmit, and/or analyze the received data. In some embodiments, the second device 160 is further configurable to maintain bidirectional communication with the first device 100 thereafter, including communication of information regarding data veracity, data transfer verification, etc. In some embodiments, the first device 100 is further configurable to maintain bidirectional communication with the second device 160 thereafter, include communication of information regarding data veracity, data transfer verification, etc.

In some embodiments, the second device 160 transmits a control signal continuously, or at pre-defined intervals, and the first device 100 determines that the second device 160 is in proximity when the first device detects the control signal and/or when the first device detects a threshold value of the control signal. Alternatively, the first device 100 can periodically transmit a signal indicating its presence, e.g. periodically or when there is some basis to infer that the second device 160 is nearby (e.g. the first device is bumped in a specific manner). The second device can detect the signal automatically, or can be prompted to look for the signal, e.g. upon receiving an input such as a user input, e.g. a user touching a touch screen of the second device 160, or placing the first device 100 in contact with the touch screen. Upon detecting the signal, the second device 160 can initiate communication. In some embodiments, the first device 100 then initiates data transmission of the stored fitness parameters via the communication link 150.

In some embodiments, the second device 160 monitors the strength of the transmission from the first device 100 (via the communication component 180) and/or continues to determine physical proximity of the first device 100 (via the sensing component 170, as described above) in real time to ensure that the first and second devices remain in physical proximity to enable efficient data transfer and economize battery life on the first device. In some embodiments, the first device 100 monitors the strength of the control signal from the second device 160 (via the communication component 120) in real time to ensure that the first and second devices remain in physical proximity.

In some embodiments, if during data transmission it is deemed that the first and second devices are no longer in physical proximity, the first device 100 terminates data transmission, and optionally stores transmission state information. In this manner, retransmission of already transmitted data is avoided during a subsequent transmission request from the second device 160. In some embodiments, the first device 100 increases the strength of data transmission, and optionally increases the amplification of the data receiving signal, if the second device 160 is no longer in physical proximity, and optionally terminates transmission when the strength of the control signal from the second device falls below a threshold. In some embodiments, the first device 100 switches to a different data transmission method/protocol if the second device 160 is no longer in physical proximity.

In some embodiments, if during data transmission it is deemed that the first and second devices are no longer in physical proximity, the second device 160 terminates data transmission, and optionally stores transmission state information. In this manner, the second device 160 can request only previously untransmitted data during a subsequent transmission request to the first device 100. In some embodiments, the second device 160 increases the strength of data transmission/control signals, and optionally increases the amplification of the data receiving signal, if the first device 100 is no longer in physical proximity, and optionally instructs the first device to terminate transmission when the strength of the data transmission from the first device falls below a threshold. In some embodiments, the second device 160 switches to a different data transmission method/protocol if the first device 100 is no longer in physical proximity, and/or instructs the first device 100 to switch to a different data transmission method/protocol.

In some embodiments, proximity of the first and second devices can be determined by a change in capacitance of a capacitive touch screen on the second device 160 produced by the presence of the first device 100. Data communication between the two devices (using any of the techniques described above) then begins, and can continue even if the devices are separated to some extent.

Still referring to the system of FIG. 1, in some embodiments, the first device 100 has transferrable data stored thereon. In some embodiments, the second device 160 is configured to sense physical proximity with the first device 100. In some embodiments, the second device 160 is further configured to request the data from the first device 100 upon sensing physical proximity.

In some embodiments, the sensed component 110 includes at least one of a conductive portion of the first device, a magnet, an electromagnet, one or more light emitting diodes (LEDs), and a speaker. In some embodiments, the sensing component 170 includes at least one of a capacitive sensor, a magnetometer, a camera, an optical sensor, and a microphone.

In some embodiments, the first device 100 further includes one or more sensors selected from: temperature sensors, electrical sensors, conductance sensors, accelerometers, magnetometers, gyroscopes, capacitive sensors, optical sensors, cameras, and global positioning system (GPS) sensors. In some embodiments, the one or more sensors is configured to acquire the stored data. In some embodiments, the data includes fitness data of a user associated with at least one of the first device 100 and the second device 160, the fitness data including one or more of the following: heart rate, pulse rate, blood pressure, muscle electrical potential, nerve electrical potential, temperature, brain waves, motion, measures of activity, number of steps taken, geospatial parameters, and timing parameters In some embodiments, the second device 160 is further configured to generate a detection signal based on detecting the sensed component 110 of the first device 100 by the sensing component of the second device 160. In some embodiments, the second device 160 is further configured to deem the first device 110 and the second device to be in physical proximity when the detection signal meets a detection criterion. In some embodiments, the second device 160 is further configured to transfer control data to the first device 100 for configuring the first device. For example, the first device can be capable of running firmware, and the control data can be employed to install and/or upgrade the firmware on the first device.

In some embodiments, at least one of the first device 100 or the second device 160 is further configured to terminate transfer of data between the first device and the second device when the first device and the second device are no longer in physical proximity, or when the data has been transferred, or both. In some embodiments, the first device 100 is further configured to vary a power level associated with the transfer of data based on variations in the physical proximity.

In some embodiments, the first device 100 and the second device 160 are further configured to transfer the data therebetween via a communication protocol selected from: Bluetooth, low power Bluetooth (BLE), near field communication (NFC), radio frequency (RF), Wireless-Fidelity (Wi-Fi), an audio-based protocol, a light-based protocol, a magnetic field-based protocol, an electric-field based protocol, and combinations thereof.

Figure 2:
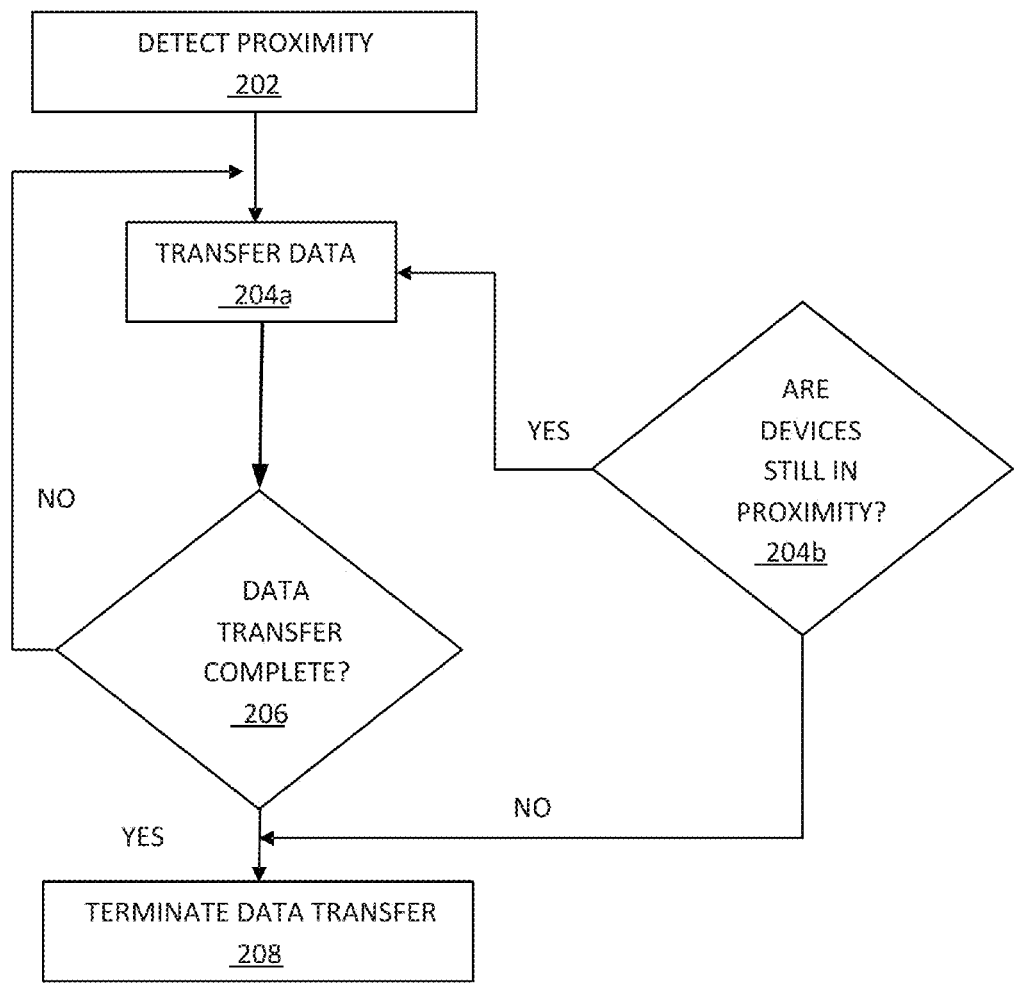
FIG. 2 is a method of wireless data transfer, according to an embodiment.
Figure 3A:
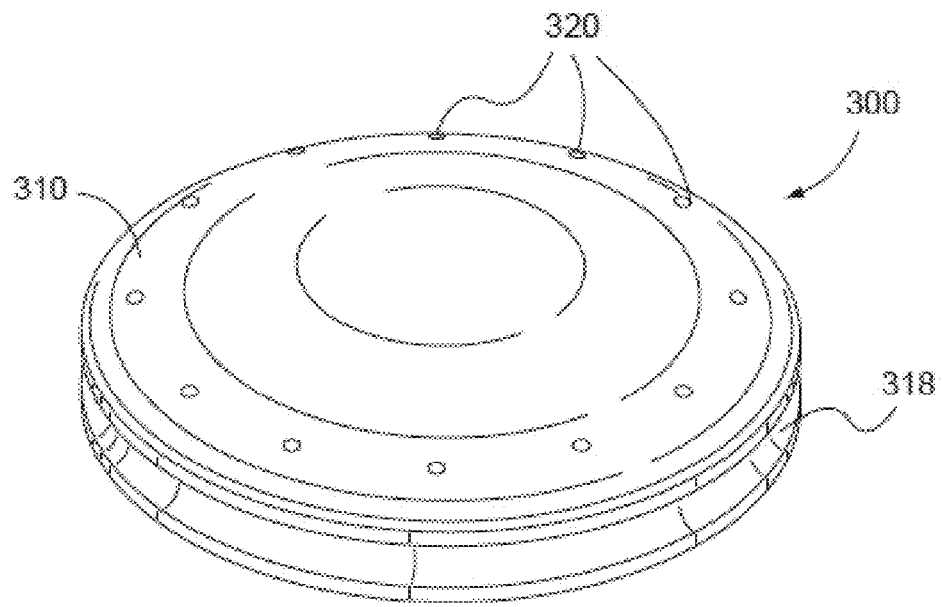
FIGS. 3A-3F are various views of a personal fitness device, according to an embodiment.
Figure 3B:
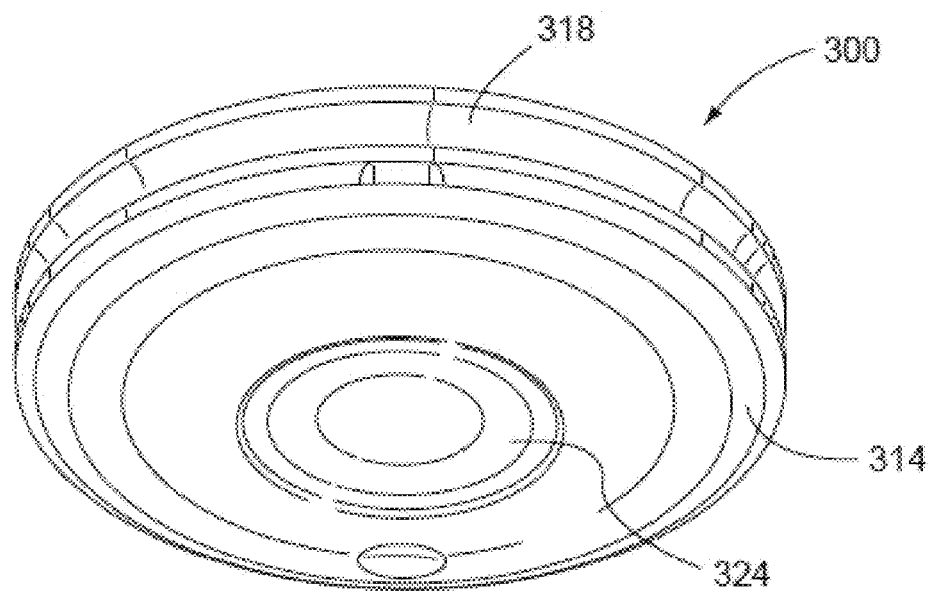
Figure 3C:
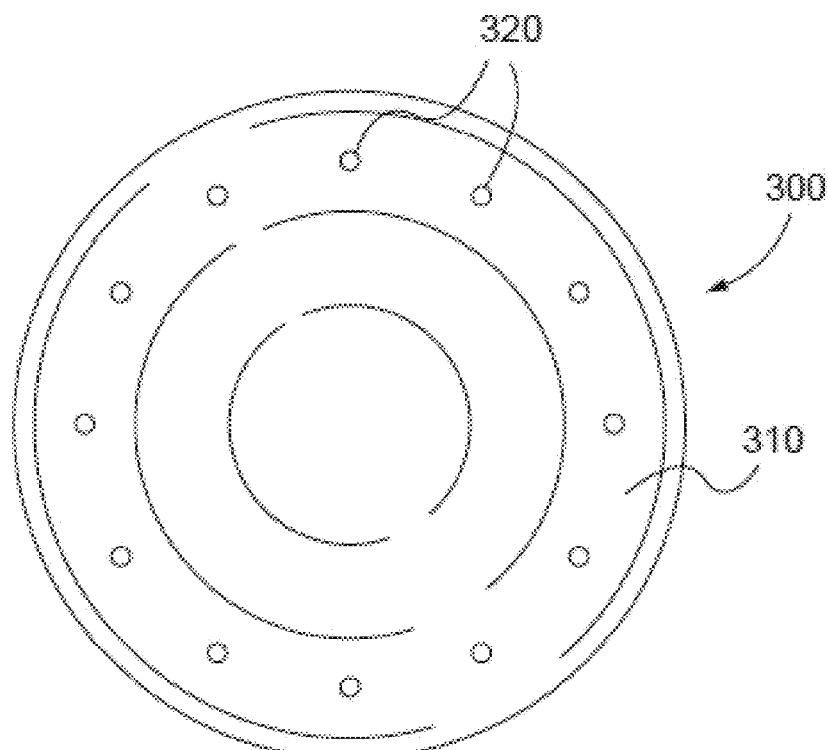
Figure 3D:
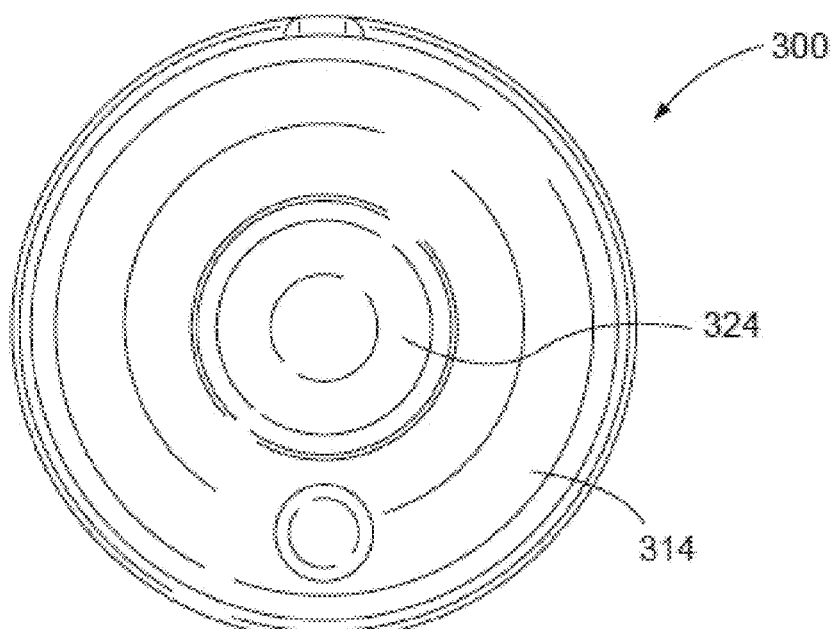
Figure 3E:
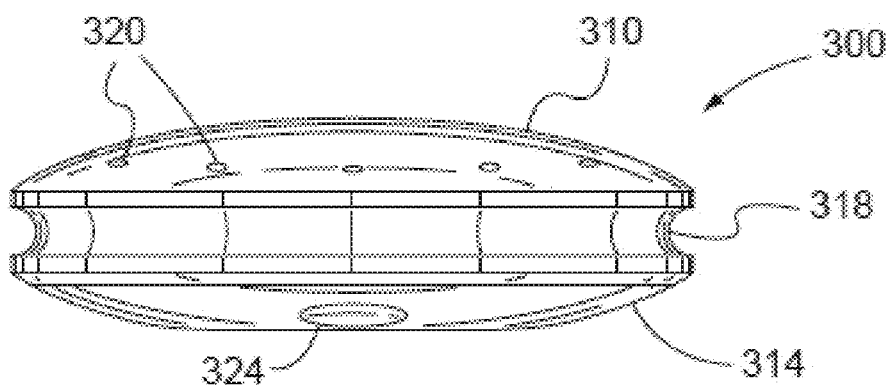
Figure 3F:
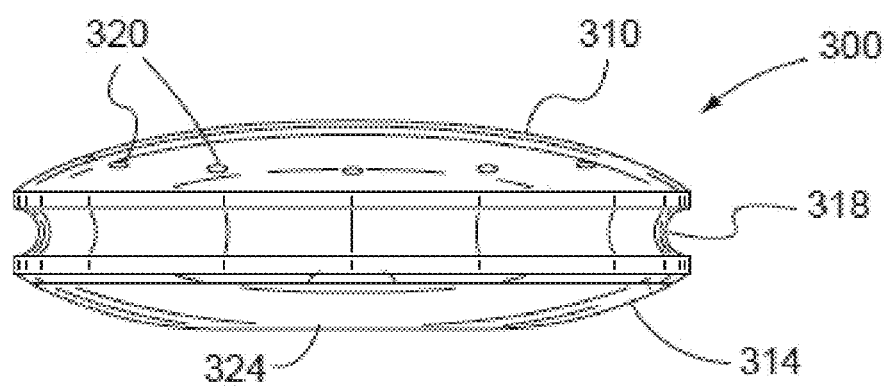
Figure 4:
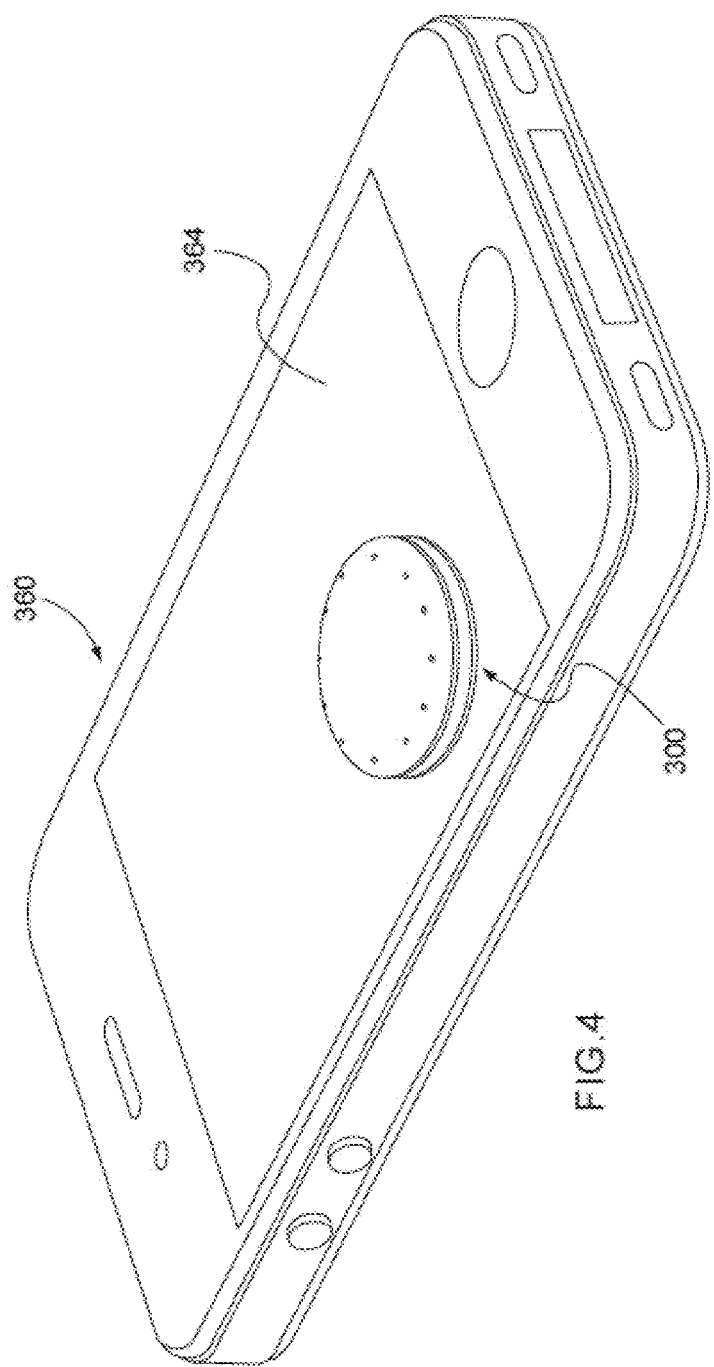
FIG. 4 is a perspective view of an exemplary data transfer setup, according to an embodiment.
Figure 5A:
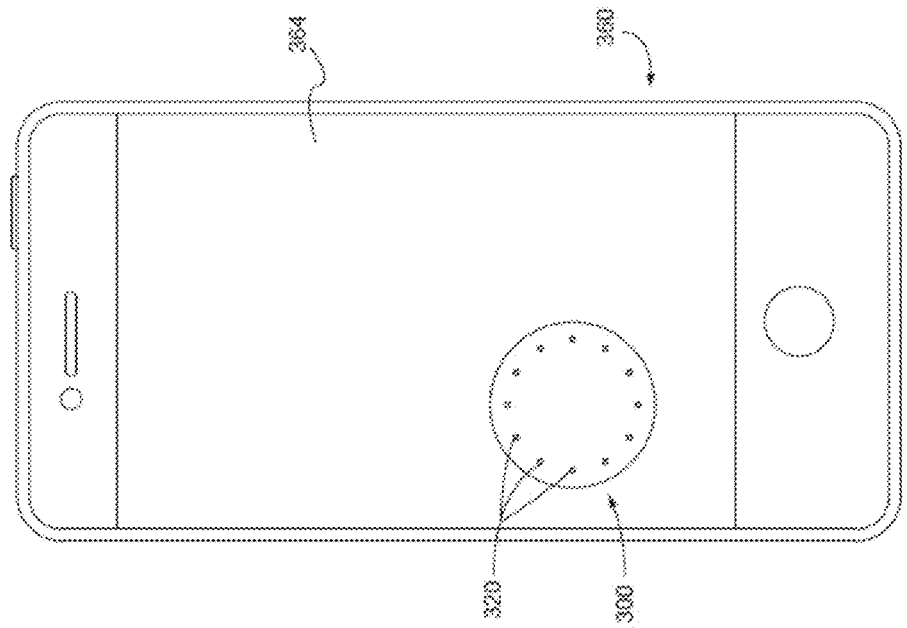
FIGS. 5A-5E are top views of the data transfer setup of FIG. 4 showing progressive illumination of light indicators, according to an embodiment.
Figure 5B:
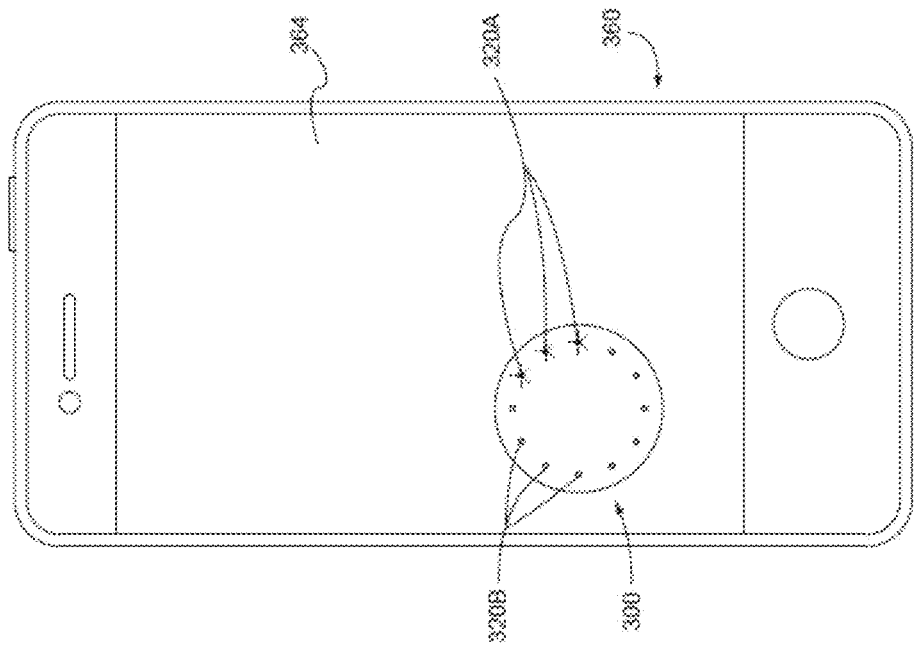
Figure 5C:
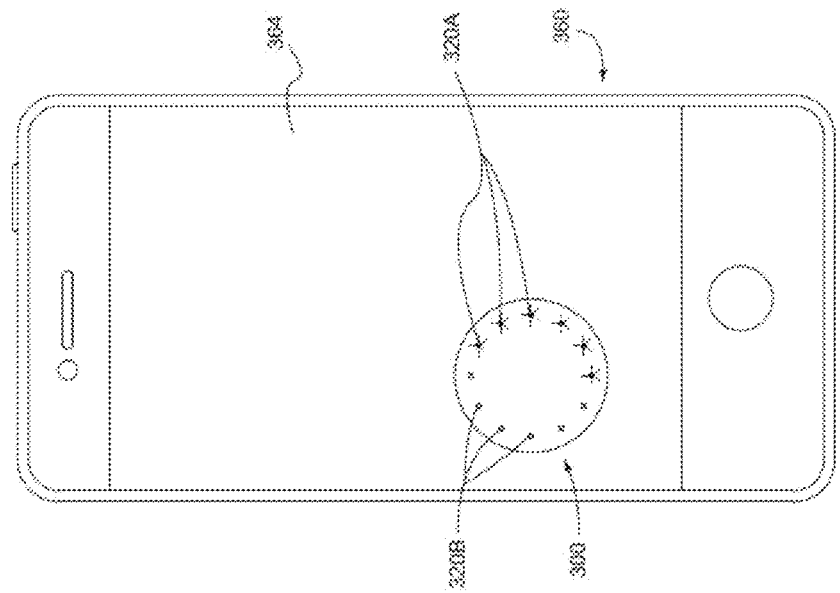
Figure 5D:
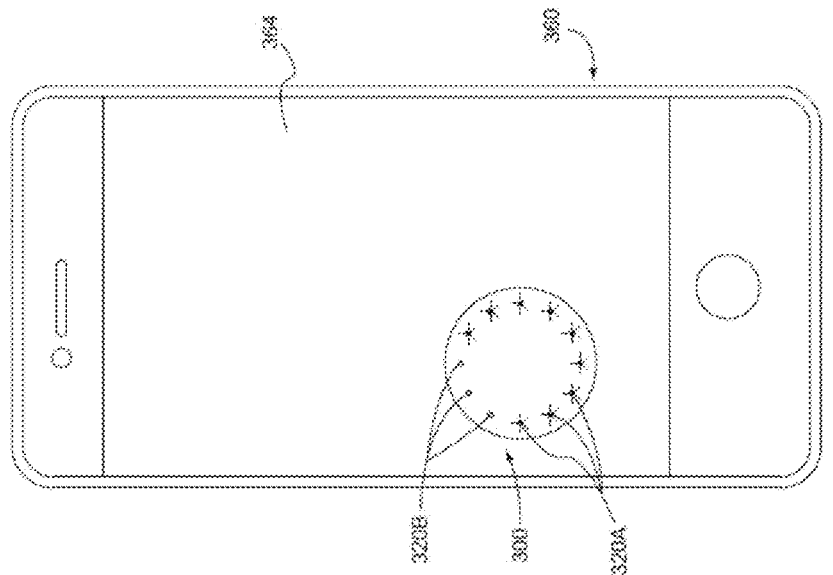
Figure 5E:
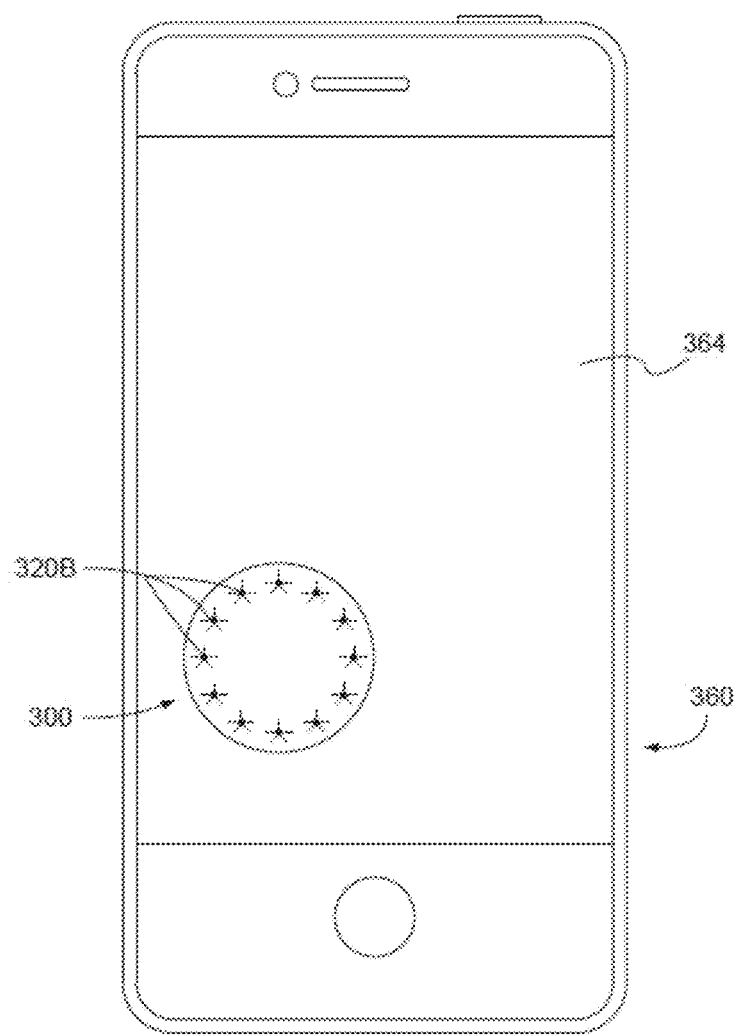

FIG. 2 illustrates an exemplary, non-limiting method 200 of data transfer, according to an embodiment. Explained here with reference to FIG. 1, it is noted that method 200 can be executed by the first device 100, by the second device 160, or both. At 202, it is determined that the first and second devices 100, 160 are in physical proximity. In some embodiments, the first device 100 determines that the second device 160 is in physical proximity, such as by monitoring a control signal of the second device 160, for example. In some embodiments, the second device 160 determines that the first device 100 is in physical proximity, such as by detecting s change in capacitance of a touch screen of the second device 160 due to a conducting surface of the first device, for example.

At 204a, at least a portion of the fitness parameters/data are transmitted by the first device 100 and received by the second device 160. At 206, it is determined whether the data transfer is complete. In some embodiments, data transfer is considered complete when all the stored fitness parameter data has been transferred from the first device 100 to the second device 160. In some embodiments, data transfer is considered complete when the control signal from the second device 160 includes a request for at least a portion of the fitness parameters/data, and when the requested portion has been successfully transmitted by the first device 100 and received by the second device 160. If data transfer is considered complete, the transmission ends at 208. If data transfer is incomplete, steps 204a, 204b (described below) are repeated.

Simultaneously with step 204a, at 204b, the proximity of the first and second devices 100, 160 is monitored in real time by the first device and/or by the second device. If the devices are deemed to continue to be in proximity at 204b, data transfer is continued at step 204a. If the devices are no longer deemed to be in proximity at 204b, data transfer is terminated at 208. Alternatively, data transfer can be continued even if the devices are no longer deemed to be in proximity.

As illustrated in FIGS. 3A-3F, in some embodiments, the first device 300 can be designed as a saucer-shaped structure having a first convex surface 310, a second substantially convex surface 314, and a channel 318 between the first 310 and second surfaces 314. The first convex surface 310 includes a plurality of independently controllable light indicators 320 such as, for example, LEDs. As described in detail below, in some embodiments, the LEDs 320 can be used to indicate the progress of data transfer from the first device 300 to a user. In some embodiments, the LEDs 320 can be controlled to blink in a specific pattern to communicate the fitness parameters/data to a visual sensor such as a camera on the second device. In other words, the LEDs 320 can be part of the sensed component and/or the communication component of the first device 300.

The second substantially convex surface 314 includes a relatively flat portion 324 that is conductive, and can serve as a sensed component and/or a communication component for the first device 300. The relatively flat portion 324 can be configured to increase the surface area that can be bought in contact with a flat sensing component of a second device. In some embodiments, the flat portion 324 can be made of a different material than the rest of the first device 300.

FIGS. 4 and 5A-5E illustrate an exemplary embodiment where the first device 300 of Example 1 is in physical contact with a touch screen 364 of a second device 360, illustrated here as a smart phone. Notably, the conductive flat portion 324 is in direct contact with the flat touch screen 364, which permits the second device 360 to detect the first device 300. In other words, the touch screen 364 serves as a sensing component for the second device 360.

Upon detecting that the devices 300, 360 are in proximity, data transfer can be initiated between the devices in a manner consistent with methods described herein. As best illustrated in FIGS. 5A-5E, the progress of data transfer between the devices 300, 360 can be visually communicated to the user by varying the illumination pattern of the LEDs 320. In other words, the percentage of data transfer completed can be represented by the number of LEDs 320 that are illuminated (e.g., approximately 0%, 8%, 17%, 25%, 33%, 42%, 50%, 58%, 67%, 75%, 83%, 92%, and 100%—FIGS. 5A-5E illustrate 0%, 25%, 50%, 75%, and 100%, respectively). In the illustrated embodiment, the LEDs 320 can be off initially (FIG. 5A), and be sequentially illuminated as data transfer progresses (FIGS. 5B-5E, where reference character 320A illustrates lit LEDs and reference character 320B illustrates unlit LEDs). A user can then remove the device 300 from the touch screen 364 when all the LEDs 320 are lit (FIG. 5E), since this is indicative of completed data transfer.

In this manner, the design of the first device 300 offers several benefits. The asymmetric placement of the LEDs 320 on the first convex surface 310 and the flat portion 324 on the second convex surface 320 visually informs the user of how the first device 300 should be placed on the touch screen 364. The relatively flat portion 324 can stabilize the first device 300 on the touch screen 364. The illustrated placement of the first device 300 on the second device 360 requires deliberation on the part of the user, and prevents inadvertent data transfer if the user accidentally brushes or bumps the two devices together, which in turn conserves power. In some embodiments, user involvement/deliberation can be ensured by requiring the user to touch a portion of the first convex surface 310 (not shown), which in turn amplifies the conductance between the flat portion 324 and the touch screen 364.

Further, since the user is likely unable to use the second device 360 in this arrangement, the pattern of LEDs serves as an easily discernable indicator of visual progress. In some embodiments, the display of the touch screen 364 can be updated in real time to display visual information associated with the data transfer between the devices 300, 360 (not shown). For example, the touch screen can show a corresponding circle pattern around the first device 300 that follows the progress of the LEDs as a progress indicator for data transfer. By providing an aesthetic display and/or motivational information, the user is encouraged to carry out data transfer regularly. By having the corresponding progress indicator that encircles the first device 300, the user only has to glance at one location to determine that data exchange is occurring and that both devices are communicating successfully. In another embodiment, the act of placing the device 300 on the screen triggers a visual display element to occur on the screen in proximity to the device 300. The second device can detect the presence of the first device by monitoring the change in the electric field in the way that the placement of a finger on a touch screen is detected. Examples of the visual display element that is displayed on the screen in proximity to the first device include a circle surrounding the first device, a polygon surrounding the first device, at least one pixel that moves in a pattern to move around the first device, or any indication on the screen that informs the user that the first device has been placed on the screen. Preferably, the visual display element identifies the location of the first device on the touch screen to the user, for example by creating a shape that at least partially surrounds the perimeter of the first device.

Figure 6:
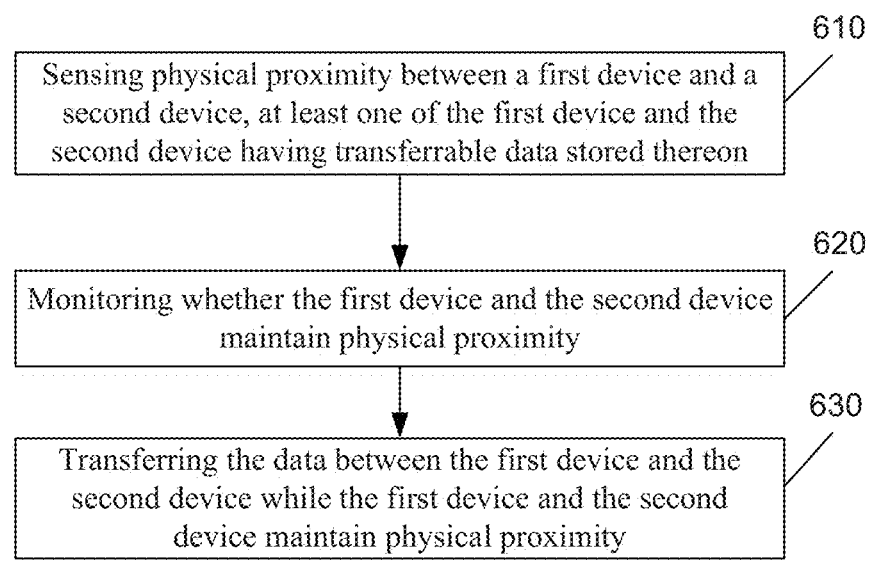
FIG. 6 is method of wireless data transfer, according to an embodiment.

FIG. 6 illustrates a method 600, according to embodiments. It is noted that method 600 can be executed by the first device 100, by the second device 160, or both.

The method includes, at 610, sensing physical proximity between the first device and the second device. At least one of the first device and the second device has transferrable data stored thereon. In some embodiments, sensing physical proximity can include generating a detection signal based on detecting a sensed component of the first device by a sensing component of the second device. In some embodiments, sensing physical proximity can further include deeming the first device and the second device to be in physical proximity when the detection signal meets a detection criterion.

In some embodiments, the sensed component includes a conductive component and the sensing component includes a capacitive sensor. In such embodiments, sensing physical proximity can further include deeming the first device and the second device to be in physical proximity when the conductive component of the first device detectably disrupts an electric field of the capacitive sensor of the second device.

In some embodiments, the sensed component includes a magnetic component, and the sensing component includes a magnetic sensor. In such embodiments, sensing physical proximity can further include deeming the first device and the second device to be in physical proximity when a magnetic field of the magnetic component detected by the magnetic sensor crosses a threshold value.

In some embodiments, the sensed component includes an optical component, and the sensing component includes an optical sensor. In such embodiments, sensing physical proximity can further include deeming the first device and the second device to be in physical proximity when the optical component is detectable by the optical sensor.

In some embodiments, the sensed component includes an acoustic component, and the sensing component includes an acoustic sensor. In such embodiments, sensing physical proximity can further include deeming the first device and the second device to be in physical proximity when the acoustic component is detectable by the acoustic sensor.

In some embodiments, the detection signal meets the detection criterion when it crosses a threshold value, such as, for example, a noise threshold, a minimum threshold, a maximum threshold, and/or the like. In some embodiments, the detection signal meets the detection criterion when it is within a range of values, such as, for example, between a minimum threshold value and a maximum threshold value.

In some embodiments, the transferrable data is generated by one or more sensors disposed in the first device. In some embodiments, the data includes fitness data of a user.

The method further includes, at 620, monitoring, continuously or periodically, whether the first device and the second device maintain physical proximity.

The method further includes, at 630, transferring the data between the first device and the second device while the first device and the second device maintain physical proximity. In some embodiments, the destination device stores the transferred data. In some embodiments, the destination device transmits the received data without storage.

In some embodiments, each of the first device and the second device including a communication component. In such embodiments, transferring the data at 630 can further include transferring the data between the communication component of the first device and the communication component of the second device via a communication protocol.

In some embodiments, transferring the data at 630 can include transferring the data via a communication protocol selected from: Bluetooth, low power Bluetooth (BLE), near field communication (NFC), radio frequency (RF), Wireless-Fidelity (Wi-Fi), an audio-based protocol, a light-based protocol, a magnetic field-based protocol, an electric field-based protocol, and combinations thereof.

In some embodiments, the method 600 further includes transferring control data from the second device to the first device for configuring the first device.

In some embodiments, the method 600 further includes terminating transfer of data between the first device and the second device when the first device and the second device are no longer in physical proximity, or when the data has been transferred, or both.

In some embodiments, the method 600 further includes varying a power level associated with the transfer of data based on variations in the physical proximity.

In some embodiments, sensing physical proximity can further include generating a detection signal based on detecting a sensed component of the first device by a sensing component of the second device. In some embodiments, sensing physical proximity can further include deeming the first device and the second device to be in physical proximity when the detection signal meets a detection criterion. In such embodiments, transferring the data can further include transferring the data at 630 from the first device to the second via the sensed component and the sensing component.

While the sensing component is described herein as configured to detect a sensed component, it will be understood that the sensed component can generally be any sensed entity, such as, for example, a signal communicated and/or broadcast by a device, that can result in a detection signal. As an example, and as already discussed herein, in some embodiments, the sensing component can be an optical sensor. Accordingly, the sensed component/entity can encompass a light generator, the detected light itself, or both. As another example, in some embodiments, the sensed component can be the control signal itself.

Some embodiments described herein can relate to a kit including the first device and/or the second device. In some embodiments, the kit can include one or more holders for the first device and/or the second device. As an example, a kit can include the first device 300, and further include one or more accessories for holding the device such as a necklace, a wrist strap, a belt, and/or the like.

Some embodiments described herein relate to a computer storage product with a non-transitory computer-readable medium (also referred to as a non-transitory processor-readable medium) having instructions or computer code thereon for performing various computer-implemented operations. The computer-readable medium (or processor-readable medium) is non-transitory in the sense that it does not include transitory propagating signals (e.g., a propagating electromagnetic wave carrying information on a transmission medium such as space or a cable). The media and computer code (also referred to herein as code) may be those designed and constructed for the specific purpose or purposes. Examples of non-transitory computer-readable media include, but are not limited to: flash memory, magnetic storage media such as hard disks, optical storage media such as Compact Disc/Digital Video Discs (CD/DVDs), Compact Disc-Read Only Memories (CD-ROMs), magneto-optical storage media such as optical disks, carrier wave signal processing modules, and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages and/or other development tools.

Where methods and/or schematics described above indicate certain events and/or flow patterns occurring in certain order, the ordering of certain events and/or flow patterns may be modified. Additionally certain events may be performed concurrently in parallel processes when possible, as well as performed sequentially.

The invention claimed is:

1. A method, comprising:
sensing physical proximity between a first device and a second device, at least one of the first device and the second device having transferrable data stored thereon, including generating a detection signal based on detecting a sensed component of the first device by a sensing component of the second device;
monitoring whether the first device and the second device maintain physical proximity;
transferring the data between the first device and the second device while the first device and the second device maintain physical proximity; and
varying a power level associated with the transfer of data based on variation in the detection signal, including reducing the power level associated with the transfer of data when the detection signal increases, and increasing the power level associated with the transfer of data when the detection signal decreases.

2. The method of claim 1, the sensing further comprising deeming the first device and the second device to be in physical proximity when the detection signal meets a detection criterion.

3. The method of claim 2, wherein the detection signal meets the detection criterion when it crosses a threshold value.

4. The method of claim 1, wherein the sensed component includes a conductive component and the sensing component includes a capacitive component,
further comprising deeming the first device and the second device to be in physical proximity when the conductive component of the first device detectably disrupts an electric field of the capacitive component of the second device.

5. The method of claim 1, wherein the sensed component includes a magnetic component, wherein the sensing component includes a magnetic sensor,
further comprising deeming the first device and the second device to be in physical proximity when a magnetic field of the magnetic component detected by the magnetic sensor crosses a threshold value.

6. The method of claim 1, wherein the sensed component includes an optical component, wherein the sensing component includes an optical sensor,
further comprising deeming the first device and the second device to be in physical proximity when the optical component is detectable by the optical sensor.

7. The method of claim 1, wherein the sensed component includes an acoustic component, wherein the sensing component includes an acoustic sensor,
further comprising deeming the first device and the second device to be in physical proximity when the acoustic component is detectable by the acoustic sensor.

8. The method of claim 1, the sensing further comprising deeming the first device and the second device to be in physical proximity when the detection signal meets a detection criterion, the transferring the data further comprising transferring the data from the first device to the second device via the sensed component and the sensing component.

9. The method of claim 1, each of the first device and the second device including a communication component,
the transferring the data further comprising transferring the data between the communication component of the first device and the communication component of the second device via a communication protocol.

10. The method of claim 1, wherein the transferring the data includes transferring the data via a communication protocol selected from: Bluetooth, low power Bluetooth (BLE), near field communication (NFC), radio frequency (RF), Wireless-Fidelity (Wi-Fi), an audio-based protocol, a light-based protocol, a magnetic field-based protocol, an electric field-based protocol, and combinations thereof.

11. The method of claim 1, wherein the transferrable data is generated by one or more sensors disposed in the first device.

12. The method of claim 1, wherein the data includes fitness data of a user.

13. The method of claim 1, further comprising transferring control data from the second device to the first device for configuring the first device.

14. The method of claim 1, further comprising terminating transfer of data between the first device and the second device when the first device and the second device are no longer in physical proximity, or when the data has been transferred.

15. A device, comprising:
a sensing component configured to:
sense physical proximity to a fitness device;
generate a detection signal based on detecting a sensed component of the fitness device;
monitor whether the fitness device remains in physical proximity; and
a communication component configured to:
exchange data with the fitness device while the fitness device remains in physical proximity; and
vary a power level associated with the exchange of data based on variations in the detection signal, including:
reducing the power level associated with the exchange of data when the detection signal increases; and
increasing the power level associated with the exchange of data when the detection signal decreases.

16. The device of claim 15, wherein the sensing component and the communication component are the same.

17. The device of claim 15, wherein the sensing component includes at least one of a capacitive sensor, a magnetometer, a camera, an optical sensor, and a microphone.

18. The device of claim 15, wherein the data includes one or more of the following: heart rate, pulse rate, blood pressure, muscle electrical potential, nerve electrical potential, temperature, brain waves, motion, measures of activity, number of steps taken, geospatial parameters, and timing parameters.

19. The device of claim 15, the communication component further configured to terminate the exchange of data when the fitness device is no longer in physical proximity, or when the exchange of data is complete.

20. A system, comprising:
a first device; and
a second device configured to:
sense physical proximity with the first device; and
generate a detection signal based on detecting a sensed component of the first device by a sensing component of the second device,
wherein the second device is configured to:
exchange data with the first device while the first device and the second device maintain physical proximity; and
vary a power level associated with the exchange of data based on variations in the detection signal, including reducing the power level associated with the exchange of data when the detection signal increases, and increasing the power level associated with the exchange of data when the detection signal decreases.

21. The system of claim 20, the second device further configured to deem the first device and the second device to be in physical proximity when the detection signal meets a detection criterion.

22. The system of claim 20, wherein the sensed component includes at least one of a conductive portion of the first device, a magnet, an electromagnet, one or more light emitting diodes (LEDs), and a speaker.

23. The system of claim 20, wherein the sensing component includes at least one of a capacitive sensor, a magnetometer, a camera, an optical sensor, and a microphone.

24. The system of claim 20, wherein the first device further includes one or more sensors selected from: temperature sensors, electrical sensors, conductance sensors, accelerometers, magnetometers, gyroscopes, capacitive sensors, optical sensors, cameras, and global positioning system (GPS) sensors, the one or more sensors configured to acquire the data.

25. The system of claim 20, wherein the data includes fitness data of a user associated with at least one of the first device and the second device, the fitness data including one or more of the following: heart rate, pulse rate, blood pressure, muscle electrical potential, nerve electrical potential, temperature, brain waves, motion, measures of activity, number of steps taken, geospatial parameters, and timing parameters.

26. The system of claim 20, wherein the first device and the second device are further configured to exchange the data via a communication protocol selected from: Bluetooth, low power Bluetooth (BLE), near field communication (NFC), radio frequency (RF), Wireless-Fidelity (Wi-Fi), an audio-based protocol, a light-based protocol, a magnetic field-based protocol, an electric-field based protocol, and combinations thereof.

27. The system of claim 20, wherein the second device is further configured to transfer control data to the first device for configuring the first device.

28. The system of claim 20, wherein at least one of the first device or the second device is further configured to terminate the exchange of data between the first device and the second device when the first device and the second device are no longer in physical proximity, or when the exchange of data is complete.

* * * * *